Jan. 12, 1937.    E. F. WHEELER ET AL    2,067,517
ANTIBACK DRIFT EMERGENCY BRAKE
Filed Aug. 11, 1932    4 Sheets-Sheet 1

INVENTOR.
Edwin F. Wheeler.
BY Charles C. Sanford
ATTORNEYS.

Patented Jan. 12, 1937

2,067,517

UNITED STATES PATENT OFFICE 2,067,517

ANTI-BACK-DRIFT EMERGENCY BRAKE

Edwin F. Wheeler and Charles C. Sanford, Baltimore, Md.

Application August 11, 1932, Serial No. 628,390

12 Claims. (Cl. 192—4)

This invention relates to an improved design of combination emergency brake and automatic anti-back drift mechanism primarily for use in connection with motor vehicles.

It is aimed to provide a generally improved construction of emergency brake adapted for use on the drive shaft of a motor vehicle, to be located in any position between the transmission and differential, but preferably directly behind the transmission.

Another object is to provide a novel construction which will automatically prevent a motor vehicle from drifting backward when the same has been stopped on a hill or incline. Of course it is understood by the inventors that this object is not original and that numerous mechanisms have been invented to carry out the same purpose, but it is their belief that their invention is a greatly improved and novel mechanism in design and construction over previous inventions of the kind.

A further object is to provide a novel construction whereby means are provided to automatically release the anti-back drift mechanism when the transmission is shifted into reverse for backward travel of the motor vehicle, and operable by the reverse shifting rod of the said transmission.

Still another object is to provide a novel construction that combines the emergency brake and anti-back drift mechanism into one simple and compact unit, in which one brake drum and its associated brake shoes are common to both.

The more specific objects and advantages will become apparent from a consideration of the description following taken in connection with accompanying drawings illustrating an operative embodiment.

In said drawings:—

Figure 4 is a vertical sectional view taken on the line 4—4 of Figure 3, omitting the brake drum and brake shoes, and also disclosing the rear end of a transmission, and the emergency brake hand lever and its associated rods, clevises, etc., in order to bring out the details of construction.

Figure 3:
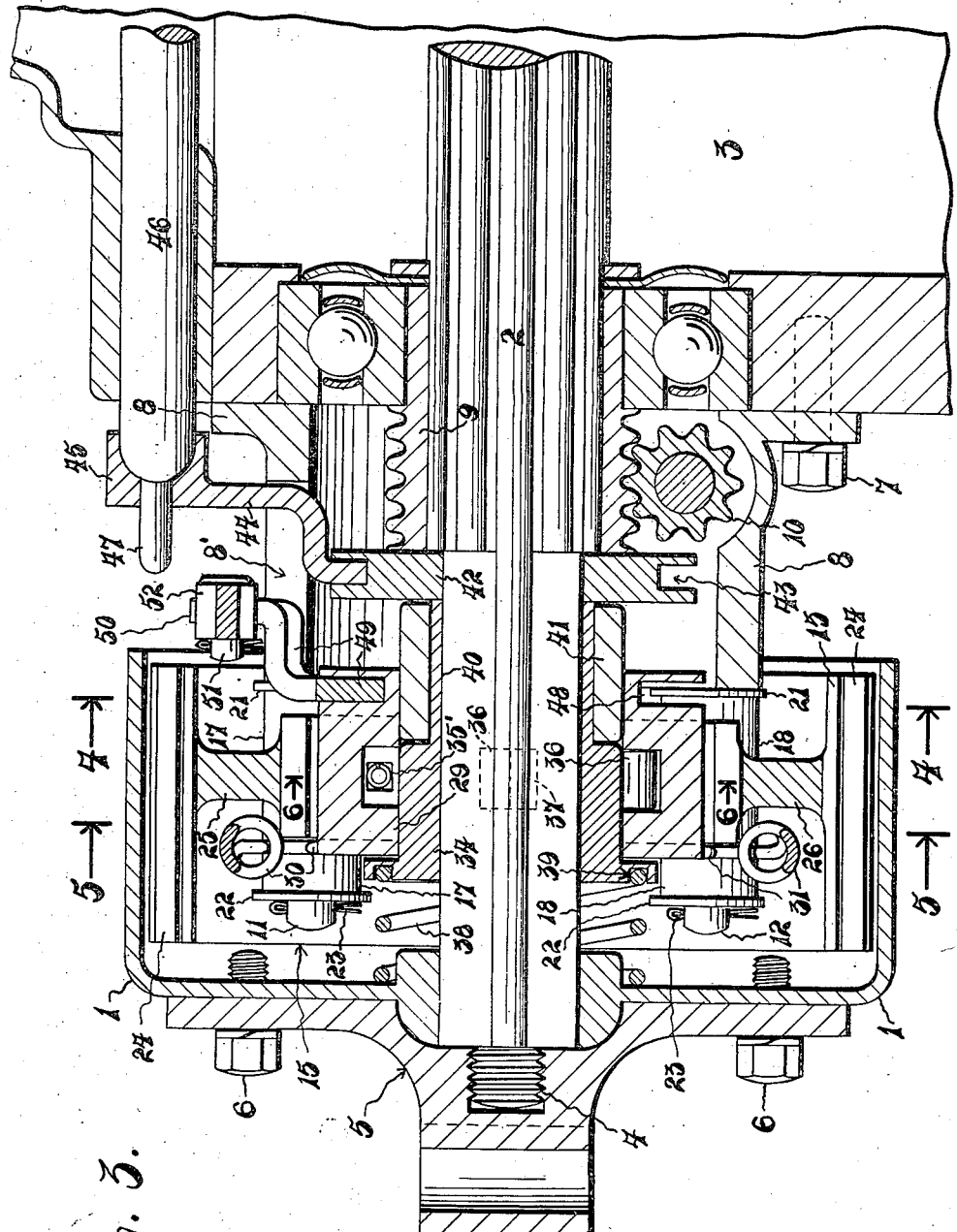
Figure 3 is a horizontal sectional view of the mechanism taken on the line 3—3 of Figure 2.
Figure 5:
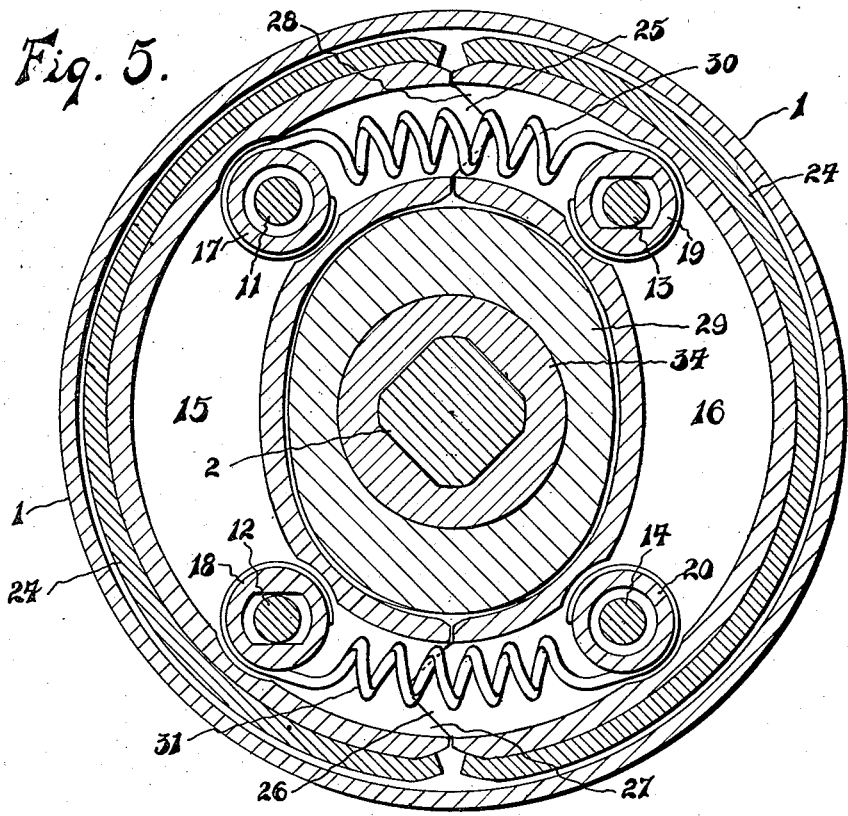
Figures 6, 7:
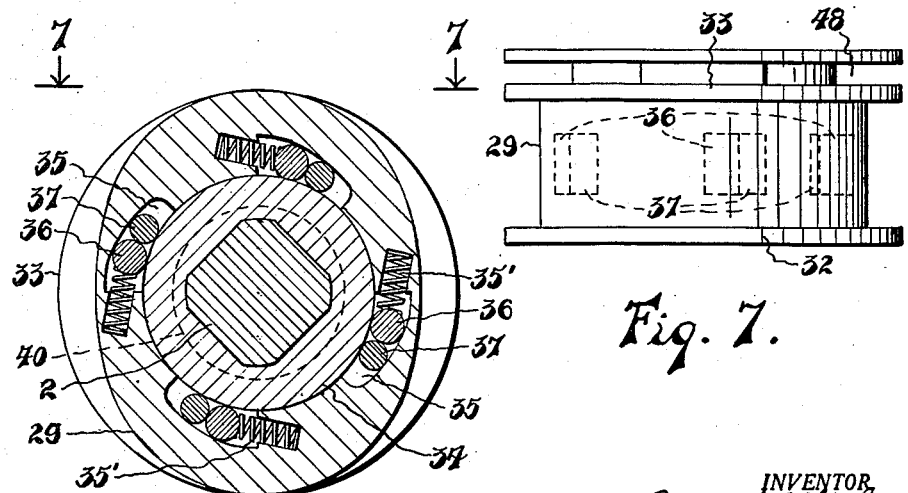

Figures 5 and 6, respectively are cross sectional views taken on the lines 5—5 and 6—6 of Figure 3.

Figure 7:
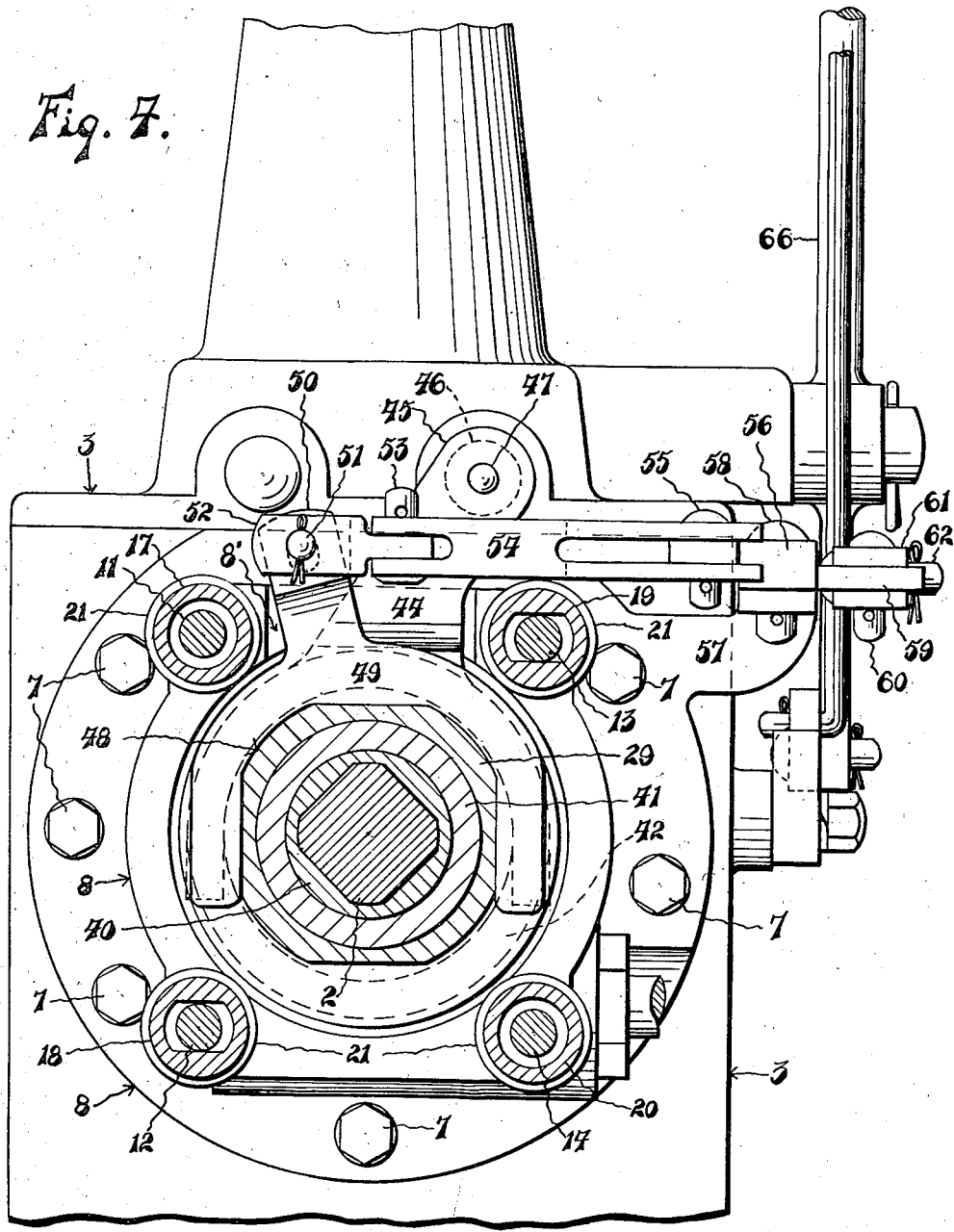

Figure 7 is a plan view of the brake shoe operating cam taken on the line 7—7 of Figure 6.

Referring specifically to the drawings, a steel brake drum 1 is secured to the squared or splined rear end of the main shaft 2 of a transmission 3, which is shown partially on the several drawings in order to show its connection with the present invention, on the extreme end 4 of the said shaft is a threaded portion which screws into the half 5 of a universal joint, which in turn is bolted with six cap screws 6 to the aforesaid brake drum. Attached to the rear end wall of the transmission 3 by cap screws 7 is a housing 8 which incloses the speedometer gears 9 and 10 of the motor vehicle and also several parts of the present invention. Integral with and extending out from the housing 8 are four rods 11, 12, 13 and 14 which act as aligning supports, for, and on which are secured two brake shoes 15 and 16 by means of the four supporting lugs 17, 18, respectively, of the brake shoe 15, and 19, 20, respectively, of the brake shoe 16, and the washers 21 on the housing side of the said brake shoes, the washers 22 on the other side and the cotter pins 23. Riveted to the said brake shoes are hard fibre composition oil and water-proof break linings 24.

Referring to Figure 5 angle lugs 25 and 26 are cast or dropped forged integral with the brake shoes 15 and 16 respectively, and corresponding angle recesses 27 and 28 respectively, are also made in the said brake shoes in order to keep them in alignment in respect to each other, and to prevent the said two brake shoes, while in their normal inactive position, from coming into frictional contact with the inside circumference of the steel drum 1.

In order to insure perfect operation of the brake shoes 15 and 16 when they are forced by the cam 29 against the steel drum 1, the lugs 18 and 19 respectively, of the said shoes 15 and 16 fit snugly but freely over the rods 12 and 13 vertically, but have sufficient play horizontally to allow their respective shoes to frictionally engage the inside circumference of the steel drum 1, while the lugs 17 and 20 have sufficient play both vertically and horizontally to allow their respective shoes 15 and 16 to engage the aforesaid drum. If all four lugs were made similar to the lugs 18 and 19, the uneven pressure on the said brake shoes by the cam 29 would cause them to bind on the rods 11, 12, 13 and 14; while if they were made similar to lugs 17 and 20, the uneven pressure of the cam 29 would prevent the said brake shoes being applied uniformly against the steel drum 1. The two brake shoes 15 and 16 are kept normally out of braking engagement with the said drum by means of the substantially heavy coil springs 30 and 31.

A cam 29 which is held between the brake shoes 15 and 16 by means of the circular guide plates 32 and 33 integral with and on each end of the said cam, (Figures 5, 6 and 7) is freely journaled on the sleeve 34 which in turn is squared or splined to the shaft 2 for sliding movement thereon and rotation therewith. Built into said cam 29 is a cam and roller type overrunning clutch composed of the recesses 35 and two sets of four graduated size rollers 36 and 37, and their associated springs 35', which grip and rotate the sleeve 34 when the said shaft rotates clockwise, (facing Figure 6) which rotation corresponds to a reverse or backward movement of the motor vehicle. The said rollers 36 and 37 of course roll into the large ends of the recesses 35 when the shaft 2 rotates counter-clockwise, (facing Figure 6) which rotation corresponds to a forward movement of the motor vehicle.

Referring specifically to Figure 3, one end of an expansive spring 38 bears against the steel drum 1 and the other end rests in a circular slot 39 on the sleeve 34. Also, on the right end of the sleeve 34 is an extension 40 integral with the said sleeve and likewise splined to the shaft 2, on which is freely journaled a circular steel bearing 41, which is normally out of engagement with the clutch rollers 36 and 37 of the cam 29. Splined to the shaft 2 for sliding movement thereon and rotation therewith is a shifting collar 42 located between the extension sleeve 40 and the larger splined section of the shaft 2 on which is splined the speedometer worm gear 9. In the circular slot 43 of the said collar 42 is a shifting fork 44, the upper end 45 of which extends through a slot or opening 8' of the housing 8 and fits on the end of the low and reverse shifting rod 46 of the transmission 3. An extension rod 47 on the said rod 46 prevents the shifting fork 44 from sliding off the rod 46 when the transmission 3 is shifted into low gear.

Integral with and on the end of the cam 29 towards the transmission 3 is a circular slot 48 in which a lever 49 engages. Referring to Figure 4, this lever which resembles a fork is squared on the inner circumference to engage a like squared portion of the said slot of the cam 29, so that a movement to the right (facing Figure 4) will impart a like movement to the said cam rotating it clockwise (facing Figure 4) on the sleeve 34. The upper end 50 of the lever 49 also extends through the opening 8' and is attached by a clevis pin 51 to a clevis 52 to which is secured by the clevis pin 53 a rectangular clevis rod 54; attached to the other end of the said rod 54 by a clevis pin 55 is a right angle lever 56 which is supported by the extension 57 of the housing 8, and revolves on its axis, the pin 58. On the end 59 of the said right angle lever is attached by the clevis pin 60 a clevis 61 which in turn is secured by the clevis pin 62 a rod clevis 63. One end of a steel rod 64 is threaded and screwed into the said clevis 63, being locked by the lock nut 65 in position after proper adjustment, while the other end is bent 90 degrees and attached to the emergency brake hand lever 66 and held in place by the cotter pin 67.

Figure 2:
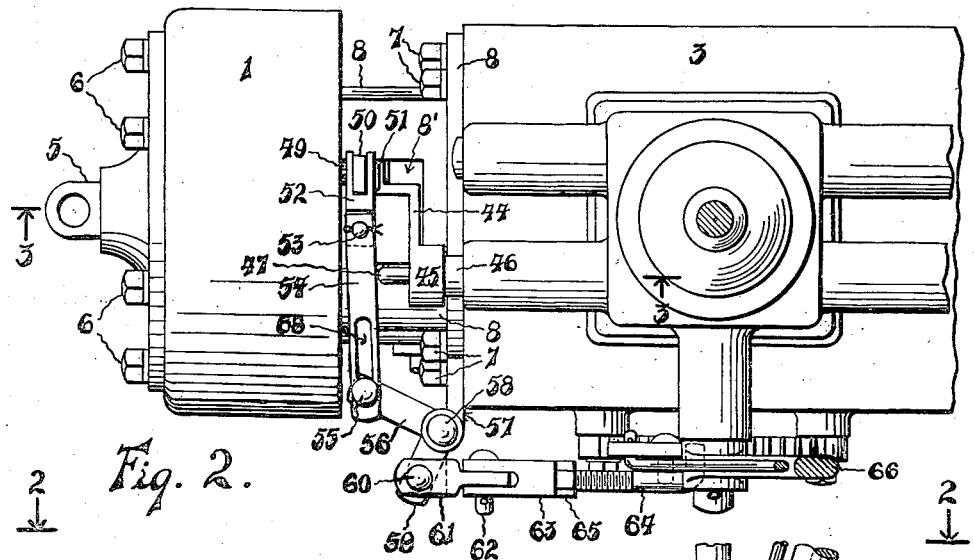
Figure 2 is a plan view of Figure 1.
Figure 1:
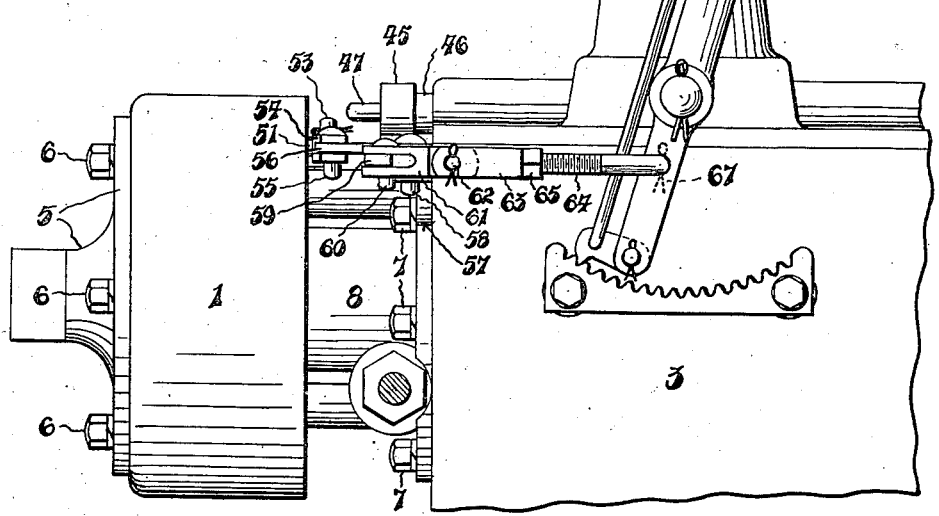
Figure 1 is a side elevation of the mechanism and a transmission to which it is attached.

As can be seen on Figures 1 and 2 when the hand lever 66 is pulled towards the operator of the motor vehicle, the various rods, clevises, etc., which are connected together between the hand lever 66 and the lever 49 cause the last mentioned lever to move to the right, (facing Figure 4) which in turn rotates the cam 29 forcing it against the brake shoes 15 and 16 and thereby applying their associated linings 24 against the steel drum 1 to brake the movement of the motor vehicle.

In order to allow automatic application of the emergency brake when the motor vehicle drifts backward, without interference by the clevises, rods, etc., connected to the hand lever 66, a longitudinal slot 68 is provided in the rectangular clevis rod. This slot allows the said rod 54 to move to the right, (facing Figure 4) as it would otherwise be prevented from doing so by the right angle lever 56, its associated clevises and rods, and the hand lever 66, in its off position.

The aforesaid hand lever like the transmission shown, is of course the usual lever used to apply the emergency brake on a motor vehicle; but the inventors do not intend to restrict the operation of their emergency brake to a lever of this type.

Specifically in the operation of the parts previously explained, when the operator of the motor vehicle desires to apply the emergency brake he manipulates the hand lever 66 in the usual manner, which as previously explained, moves the lever 49 to the right (facing Figure 4) rotating the cam 29 clockwise (facing Figure 5) which bears against the brake shoes 15 and 16 forcing their associated brake linings 24 in frictional contact with the inside surface of the steel drum 1 and thereby braking the movement of the motor vehicle.

Referring to the automatic operation of the emergency brake, when the transmission of the motor vehicle is in a forward speed and the vehicle drifts backward on an incline or hill; this backward movement causes the main shaft 2 to rotate clockwise, (facing Figures 5 and 6) which rotates the sleeve 34 in like manner forcing the rollers 36 and 37 to roll clockwise toward the small ends of their respective recesses 35 locking the said sleeve with the cam 29, which then rotates clockwise applying the brake as above explained in connection with the hand operation.

The automatic release of the anti-back drift mechanism when the transmission is shifted into reverse gear operates as follows:

Referring to Figure 3, the shifting of the transmission into reverse gear moves the low and reverse gear shifting rod 46 to the left, which bears against and moves the shifting fork 44 in like direction carrying with it the collar 42. The said collar bears against the extension 40 of the sleeve 34 moving the said sleeve to the left against the tension of the coil spring 38. As the steel bearing 41 is journaled on the extension 40 it is also moved along with the sleeve 34, until at the end of the movement of the shifting rod 46, the said steel bearing is in a position between the rollers 36 and 37 and the extension 40 of the said sleeve. Then when the motor vehicle travels in a reverse or backward direction the shaft 2 rotating clockwise has no effect on the cam 29, because the sleeve 34 rotating with the said shaft will be out of position in respect to the rollers 36 and 37, but its extension 40 will rotate freely inside of the steel bearing 41, which has moved into position to be locked by the said rollers preventing it from revolving. Of course when the transmission is shifted out of reverse gear into neutral or any forward speed the tensioned coil spring 38 will cause the sleeve 34, steel bearing 41, collar 42, and shifting fork 44 to return to their normal positions as shown in Figure 3.

While we have necessarily shown and described the preferred embodiments of our invention somewhat in detail, it is to be understood that we may vary the size, shape, and arrangement of parts within wide limits without departing from the spirit of the invention.

Having thus described our invention, what we claim is:

1. In a device of the kind described, the combination with a shaft adapted to be rotated in either direction, a mechanism associated therewith and normally connected to such shaft to automatically arrest rotation thereof in one direction, corresponding to a backward movement of the motor vehicle, consisting of a circular steel drum splined to and rotatable with the aforesaid shaft, two semi-circular internal expanding brake shoes associated therewith, a longitudinal sliding member on and rotatable with the said shaft, a duplex cam rotatable on the said member, a locking element of the cam and roller over-running clutch type carried by the said duplex cam, and operable between the said member and said cam in the aforesaid direction of rotation to rotate the said cam to expand the said brake shoes and their associated linings into frictional contact with the inner circumferential surface of the said steel drum, but inoperable in the opposite direction, corresponding to a forward movement of the motor vehicle.

2. In a device of the kind described, the combination with a shaft adapted to be rotated in either direction, a mechanism associated therewith and normally connected to such shaft to automatically arrest rotation thereof in one direction, corresponding to a backward movement of the motor vehicle, consisting of a circular steel drum splined to and rotatable with the aforesaid shaft, two semi-circular internal expanding brake shoes, associated therewith, a longitudinal sliding member on and rotatable with the said shaft, a duplex cam rotatable on the said member, a locking element of the cam and roller over-running clutch type carried within the said duplex cam, and operable to lock the said member and said cam in the aforesaid direction of rotation of the said shaft, to rotate the said cam to expand the said brake shoes and their associated linings into frictional contact with the inner circumferential surface of the said steel drum, said locking element automatically unlocking upon rotation of the said shaft in the opposite direction, and means to return the various parts of the said mechanism to their respective normal positions.

3. In a device of the kind described, the combination with a shaft adapted to be rotated in either direction, a mechanism associated therewith and normally connected to such shaft to automatically arrest rotation thereof in one direction, corresponding to a backward movement of the motor vehicle, by means of an internal expanding type brake, operable by means of a duplex cam, locked by a locking element carried therein, to a longitudinal sliding member splined to and rotatable with the aforesaid shaft, said locking element automatically unlocking upon rotation of the said shaft in the opposite direction, and means constructed and arranged to automatically render said mechanism inoperative to permit rotation of the aforesaid shaft in either direction, comprising a shifting yoke, a collar longitudinally sliding the aforesaid longitudinal sliding member, and a rotatable member rotatable on the said sliding member.

4. In a device of the kind as described in claim 3, means constructed and arranged to automatically render the said mechanism inoperative to permit rotation of the said shaft in either direction, coacting with the shifting into reverse of the transmission of the motor vehicle, said means operable to unlock the locking element carried by the said brake operating cam in respect to the said longitudinal sliding member, and operable to lock the said locking element in respect to the said rotatable member, thereby allowing the said cam to remain stationary and inoperative in respect to the said brake.

5. In a device of the kind described the combination with a shaft adapted to be rotated in either direction, a mechanism associated therewith and normally connected to such shaft to automatically arrest rotation thereof in one direction, corresponding to a backward movement of the motor vehicle, by means of an internal expanding type brake, operable by means of a duplex cam, locked by a locking element carried therein, to a longitudinal sliding member splined to and rotatable with the aforesaid shaft, said locking element automatically unlocking upon rotation of the said shaft in the opposite direction, means constructed and arranged to automatically render said mechanism inoperative to permit rotation of the aforesaid shaft in either direction, coacting with the shifting into reverse of the transmission of the motor vehicle, said means operable to unlock the said locking element in respect to the said longitudinal sliding member, and operable to lock the said locking element in respect to the said rotatable member, consisting of a shifting yoke carried by a collar, operable to move the aforesaid longitudinal sliding member and a rotatable member rotatable thereon and slidable therewith, and means to automatically render the said mechanism again operative, coacting with the shifting out of reverse into neutral or any forward speed of the transmission of the motor vehicle, comprising a circular coiled expansive spring.

6. In an improved drive shaft emergency brake for motor vehicles, the combination of a brake operable manually to arrest movement of the motor vehicle in either direction, and a mechanism associated therewith, operable automatically to arrest backward movement, but allowing forward movement thereof, said brake operable manually and automatically by means of a floating duplex cam centrally located between and rotatable to expand floatingly mounted internal expanding brake shoes associated with the said brake.

7. In an improved drive shaft emergency brake for motor vehicles, the combination of a shaft transmitting power to the wheels of the motor vehicle, a mechanism associated therewith and normally connected to such shaft to automatically arrest rotation thereof in one direction, corresponding to a backward movement of the motor vehicle, consisting of floatingly mounted internal expanding brake shoes, operable by rotation of a duplex cam centrally located therein, associated with the said mechanism to automatically arrest backward movement of the motor vehicle, and means to manually rotate the said duplex cam to arrest movement of the motor vehicle in either direction, consisting of a lever rotatable with and secured to the said duplex cam.

8. In an improved emergency brake for motor vehicles, the combination of a transmission, and a transmission shaft transmitting power to the wheels of the motor vehicle, a brake associated therewith to arrest rotation thereof in either direction, consisting of a circular steel drum splined to and rotatable with the aforesaid shaft, two semi-circular internal expanding brake shoes associated therewith, two substantially heavy contractile springs normally holding the said brake shoes out of frictional engagement with the said steel drum, angular projections integral with and on one end of the said brake shoes normally engaging corresponding angular recesses on opposite ends of the respective brake shoes, a plurality of bearing lugs integral with the said brake shoes, secured on respective rods integral with and extending out from a housing associated with the aforesaid brake and attached to the rear wall of the aforesaid transmission.

9. In an improved emergency brake for motor vehicles, the combination of a shaft transmitting power to the wheels of the motor vehicle, a brake associated therewith to arrest rotation thereof in either direction, consisting of a circular steel drum splined to and rotatable with the aforesaid shaft, two semi-circular internal expanding brake shoes associated therewith, operable by means of a duplex cam, held in alignment between the said brake shoes by circular flanges thereon and normally stationary but rotatable on the aforesaid shaft, to expand the said brake shoes into frictional contact with the inside circumferential surface of the aforesaid steel drum.

10. In an improved emergency brake for motor vehicles, the combination of a shaft transmitting power to the wheels of the motor vehicle, a brake associated therewith to arrest rotation thereof in either direction, consisting of a circular steel drum splined to and rotatable with the aforesaid shaft, two semi-circular internal expanding brake shoes associated therewith, operable by means of a duplex cam, held in alignment between the said brake shoes and normally stationary but rotatable on the aforesaid shaft, to expand the said brake shoes into frictional contact with the inside circumferential surface of the aforesaid steel drum, operative by an associated lever rotatable therewith and secured thereto, and means operable manually to move said lever to rotate said cam to expand the said brake shoes, comprising clevises, clevis rods, an angle lever, clevis pins and cotter pins associated therewith, adjusting means on said clevis, rods, and a hand lever.

11. In an improved drive shaft emergency brake for motor vehicles, the combination with a shaft adapted to be rotated in either direction, a brake associated therewith to arrest rotation thereof in either direction, duplex cam means operable to actuate the said brake manually by means of an associated lever, and a mechanism associated with the first mentioned shaft and last mentioned brake, and normally connected to such shaft to automatically arrest rotation thereof in one direction, corresponding to a backward movement of the motor vehicle, operable by the aforesaid duplex cam through the medium of a locking element carried therein, said locking element operable automatically to rotate the said duplex cam to actuate the aforesaid brake, but inoperable to allow rotation of the said shaft in the other direction, corresponding to a forward movement of the motor vehicle, means constructed and arranged to automatically render the said locking element inoperative to permit rotation of the aforesaid shaft in either direction, coacting with the shifting into reverse of the transmission of the motor vehicle, and means to automatically render the said locking element again operative, coacting with the shifting out of reverse into neutral or any forward speed of the said transmission.

12. In an improved drive shaft emergency brake for motor vehicles, the combination of a brake operable manually to arrest movement of the motor vehicle in either direction, and a mechanism associated therewith to automatically arrest backward movement of the motor vehicle, but permitting a forward movement thereof, said brake consisting of a circular steel drum, two internal expanding brake shoes with brake linings secured thereto, and spring means to normally prevent frictional engagement of the said brake linings with the said steel drum, and a common means to manually and automatically operate the said brake, comprising a duplex cam operable manually by means of a lever secured thereto and to the emergency hand lever of the motor vehicle, and automatically by means of a locking element carried within the said duplex cam and associated with the aforesaid mechanism.

EDWIN F. WHEELER.
CHARLES C. SANFORD.